Aug. 23, 1932.   F. W. MARCO   1,872,995
LUGGAGE CARRIER
Filed Oct. 25, 1929   2 Sheets-Sheet 1
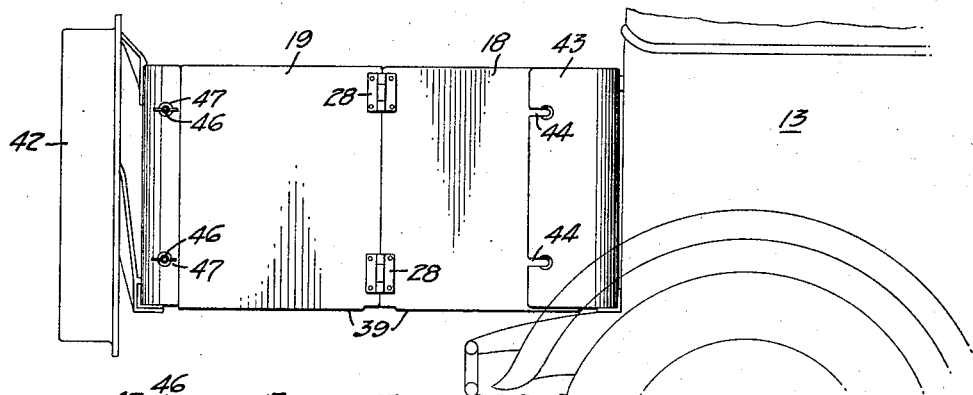
FIG_1_
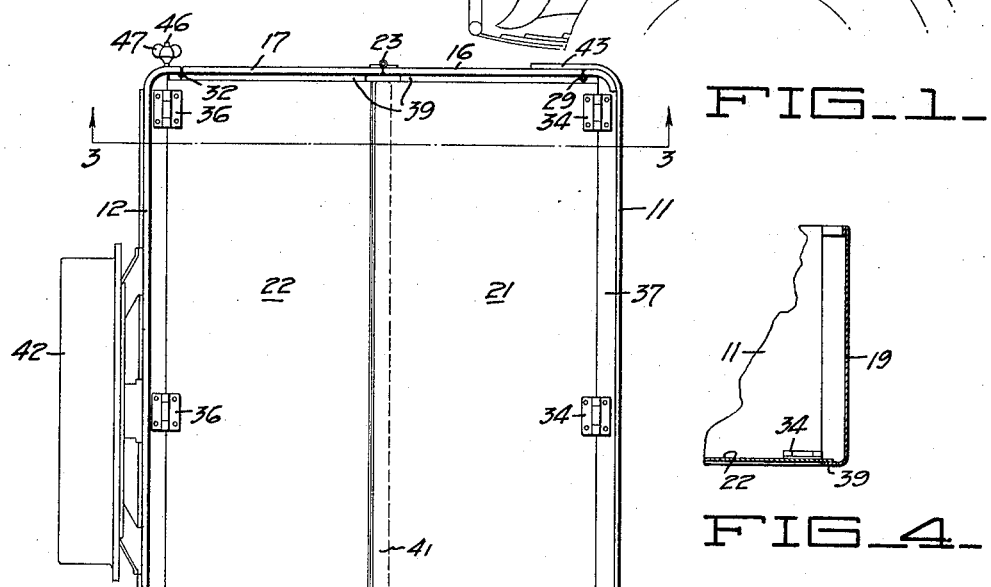
FIG_4_
FIG_2_
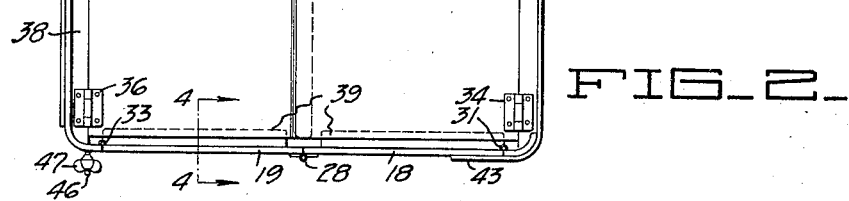
FIG_3_
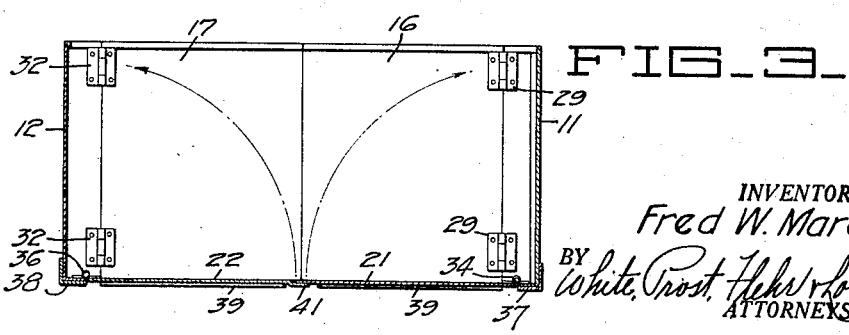
INVENTOR.
Fred W. Marco
BY
ATTORNEYS.

Aug. 23, 1932.    F. W. MARCO    1,872,995
LUGGAGE CARRIER
Filed Oct. 25, 1929    2 Sheets-Sheet 2
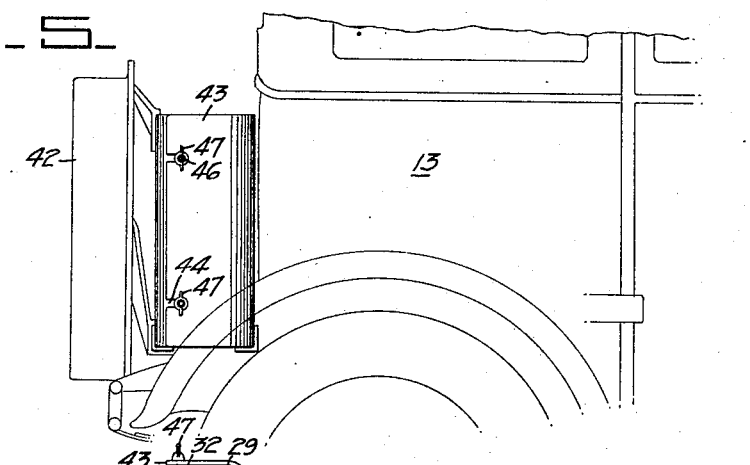
FIG_5_
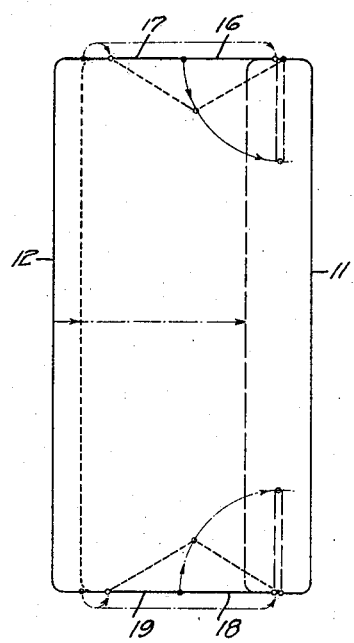
FIG_6_
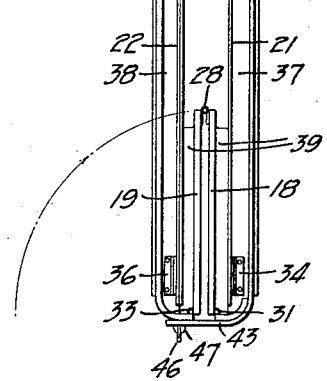
FIG_7_
INVENTOR.
Fred W. Marco
BY White, Prost, Flehr & Lothrop
ATTORNEYS.

Patented Aug. 23, 1932

1,872,995

UNITED STATES PATENT OFFICE

FRED W. MARCO, OF BERKELEY, CALIFORNIA, ASSIGNOR TO LAHER AUTO SPRING CO., INC., OF SAN FRANCISCO, CALIFORNIA, A CORPORATION OF OREGON

LUGGAGE CARRIER

Application filed October 25, 1929. Serial No. 402,342.

This invention relates generally to devices intended to be used in connection with automobiles, for carrying luggage.

It is a general object of the present invention to devise an automobile luggage carrier of novel construction, which can be readily collapsed into a relatively small space when not in use.

It is a further object of the present invention to devise a luggage carrier of the collapsible type, which when extended, will have considerable strength and can also be used for supporting a spare tire.

It is a further object of this invention to devise a collapsible automobile luggage carrier, characterized by the use of side walls which collapse inwardly, to permit the entire device to be folded or collapsed into a small space.

Further objects of the present invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view, illustrating a device incorporating my invention.

Fig. 2 is a plan view of the device shown in Fig. 1.

Fig. 3 is a cross sectional view taken along the line 3—3 of Fig. 2.

Fig. 4 is a cross sectional detail taken along the line 4—4 of Fig. 2.

Fig. 5 is a side elevational view of my device in collapsed position.

Fig. 6 is a plan view of the device as shown in Fig. 5.

Fig. 7 is a diagrammatic view illustrating the manner in which my device is collapsed.

The device illustrated in the drawings consists of upright forward and rear walls 11 and 12 which can be made of some suitable material, such as sheet metal. Wall 11 can be rigidly secured or mounted upon the back of the automobile body or frame, indicated at 13, so that both walls 11 and 12 extend laterally of the automobile. Wall 11 is the forward wall in the sense that it is the nearest the forwarl end of the automobile. Corresponding ends of the walls 11 and 12 are connected together by upright wall sections 16—17, and sections 18—19. The bottom of the carrier is formed by wall sections 21 and 22.

To permit the carrier to collapse, bottom wall sections 21 and 22 are arranged to swing upwardly towards walls 11 and 12 respectively, and side wall sections 16—17, and 18—19, are arranged to collapse inwardly. Thus wall sections 16—17 are shown pivotally connected by means of hinges 23, and correspondingly wall sections 18—19 are pivotally connected by hinges 28. Wall sections 16 and 18 are also pivotally connected to the corresponding end portions of wall 11 by means of hinges 29 and 31 respectively. Side wall sections 17 and 19 are pivotally connected to corresponding end portions of wall 12 by means of hinges 32 and 33 respectively.

To permit wall 21 to swing upwardly, the edge of this wall section adjacent the lower edge of wall 11, is provided with a pivotal connection formed by hinges 34. Bottom wall section 22 is likewise pivotally connected to wall 12, by means of hinges 36. Instead of having the pivotal axes of hinges 34 and 36 in the planes of walls 11 and 12 respectively, these hinges are preferably carried by flange portions 37 and 38 respectively. The lower edges of wall sections 16—17 and 18—19, are preferably provided with inturned flange portions 39 (Fig. 4), upon which bottom wall sections 21 and 22 can rest when the carrier is extended. The inner edge of bottom wall section 22 can also be provided with an offset edge portion 41 (Fig. 3), which will overlap the corresponding edge portion of bottom wall section 21 when the carrier is extended.

It is frequently desirable to have a spare tire carrier at the rear of the vehicle, in addition to my collapsible luggage carrier. My device can be combined with a tire carrier in the manner shown in Figs. 1 and 2. Thus in this case I have shown a spare tire carrier 42, suitably mounted upon the wall 12. Because of the manner in which my carrier is collapsed, as will be presently explained, the spare tire may remain upon carrier 42 for both collapsed and extended positions.

To collapse my carrier from extended position shown in Figs. 1 to 3 inclusive, the operator first swings bottom wall sections 21 and 22 upwardly until they are in juxtaposition with the walls 11 and 12 respectively, and then the end wall sections 16—17 and 18—19 are swung inwardly while wall 12 is moved toward wall 11. This operation is shown diagrammatically in Fig. 7, in which the wall sections 16—17 and 18—19 are shown collapsed inwardly while wall 12 is moving toward stationary wall 11. The device is shown in fully collapsed position in Figs. 5 and 6. It is of course desirable to provide means for positively locking the device in collapsed position. Such a means can be conveniently formed by providing wings 43 extending forwardly from the ends of wall 11. These wings are provided with slots 44 adapted to receive threaded studs 46, these studs being carried by the ends of wall 12. Nuts 47 can be tightened upon wing portions 43 to obtain a secure locking engagement.

It is apparent from Figs. 5 and 6 that when my device is collapsed, it not only occupies a minimum of space, but is relatively neat in appearance. The operations of extending or collapsing my carrier are comparatively simple, and can be accomplished without applying an undue amount of force. Sufficient structural strength is afforded to carry a large amount of luggage, in addition to the spare tire, if it is desired to incorporate the spare tire carrier as explained above.

I claim:

1. In a collapsible luggage carrier for an automobile, forward and rear upright walls adapted to extend laterally of the automobile, one of said walls being adapted to be rigidly secured to the automobile frame, a bottom wall section hingedly secured to each of said first named walls and adapted to swing upwardly from a substantially horizontal position when the carrier is extended, and collapsible side wall sections hingedly connected together and to the first named walls respectively, said side wall sections extending substantially at right angles to the front and rear walls when the carrier is extended and collapsible inwardly after the bottom wall sections have been swung upwardly.

2. In a collapsible luggage carrier for an automobile, forward and rear upright walls adapted to extend laterally of the automobile across the back thereof, one of said walls being adapted to be rigidly secured to the automobile frame, a bottom wall section hingedly secured to the lower edge of said rear wall, another bottom wall section hingedly secured to a lower edge of the forward upright wall, said wall sections swinging downwardly to a common horizontal plane when the carrier is extended, and a pair of wall sections adjacent the end portions of the forward and rear walls, the sections of each of said pairs being hinged together and hinged to the corresponding end portions of the front and rear walls, whereby they can be collapsed inwardly between the forward and rear walls after said bottom wall sections have been swung upwardly.

3. In a collapsible luggage carrier for an automobile, forward and rear upright walls adapted to extend laterally of the automobile across the back thereof, one of said walls being adapted to be rigidly secured to the automobile frame, a bottom wall section hingedly secured to one of said lateral upright walls, and side walls hingedly secured to the front and rear lateral walls, each of said side walls comprising a pair of sections hingedly secured together, whereby the luggage carrier can be collapsed by swinging the side walls and the bottom wall inwardly into the compartment formed by said carrier.

4. In a collapsible luggage carrier for an automobile, forward and rear upright walls adapted to extend laterally of the automobile across the back thereof, one of said walls being adapted to be rigidly secured to the automobile frame, a bottom wall section hingedly secured to the lower edge of said rear wall, another bottom wall section hingedly secured to a lower edge of the forward upright wall, said wall sections swinging downwardly to a common horizontal plane when the carrier is extended, and a pair of wall sections adjacent the end portions of the forward and rear walls, the sections of each of said pairs being hinged together and hinged to the corresponding end portions of the front and rear walls, whereby they can be collapsed inwardly between the bottom wall sections after said bottom wall sections have been swung upwardly.

In testimony whereof, I have hereunto set my hand.

FRED W. MARCO.